US005649195A

United States Patent [19]
Scott et al.

[11] Patent Number: 5,649,195
[45] Date of Patent: Jul. 15, 1997

[54] SYSTEMS AND METHODS FOR SYNCHRONIZING DATABASES IN A RECEIVE-ONLY NETWORK

[75] Inventors: Roderick Keith Scott, Durham; Ling-Ching Wang Tai, Cary, both of N.C.

[73] Assignee: International Business Machines Corporation, Armonk, N.Y.

[21] Appl. No.: 446,996

[22] Filed: May 22, 1995

[51] Int. Cl.$^6$ .................................................. G06F 17/30
[52] U.S. Cl. ............................... 395/617; 395/200.01
[58] Field of Search ....................... 395/600, 617, 395/650, 700, 800, 575, 425, 601, 616, 618, 619, 620, 621, 622, 200.01, 200.03, 200.04, 200.05, 200.08, 200.09, 200.1, 200.19

[56] References Cited

U.S. PATENT DOCUMENTS

| | | | |
|---|---|---|---|
| 4,553,222 | 11/1985 | Kurland et al. | 364/900 |
| 5,230,073 | 7/1993 | Gausmann et al. | 395/600 |
| 5,261,094 | 11/1993 | Everson et al. | 395/600 |
| 5,263,156 | 11/1993 | Bowen et al. | 395/600 |
| 5,280,612 | 1/1994 | Lorie et al. | 395/600 |
| 5,327,557 | 7/1994 | Emmond | 395/650 |
| 5,404,508 | 4/1995 | Konrad et al. | 395/600 |
| 5,560,005 | 9/1996 | Hoover et al. | 395/600 |

FOREIGN PATENT DOCUMENTS

| | | |
|---|---|---|
| 0 405924A2 | 1/1991 | European Pat. Off. . |
| 4-165437 | 4/1992 | Japan . |
| 4-84238 | 4/1992 | Japan . |
| WO94/14125 | 6/1994 | WIPO . |

OTHER PUBLICATIONS

WPAT Database—Article Entitled—Automatic Database Synchronization for Interspan Information Access Service—Propagating and Applying Database Updates, Resulting from End Users Logging in one Packing Provision Requests, to Databases of all Participating USDS & CPS, Apr. 1993.

*Primary Examiner*—Thomas G. Black
*Assistant Examiner*—Ruay Lian Ho
*Attorney, Agent, or Firm*—Needham J. Boddie, II; John D. Flynn

[57] ABSTRACT

Systems and methods for synchronizing a plurality of databases are provided for a plurality of geographically dispersed computers in receive-only communication. Each change made to a master database in a central computer is broadcast to a plurality of remote computers, each containing a replica of the master database, via a packet having an assigned next-broadcast-number and a sequential next-sequence-number. Each remote computer has means for comparing the next-broadcast-number and next-sequence-number of each received packet with the last-broadcast-number-received and last-sequence-number-received from a previous packet, and for selectively updating its replica database.

20 Claims, 8 Drawing Sheets

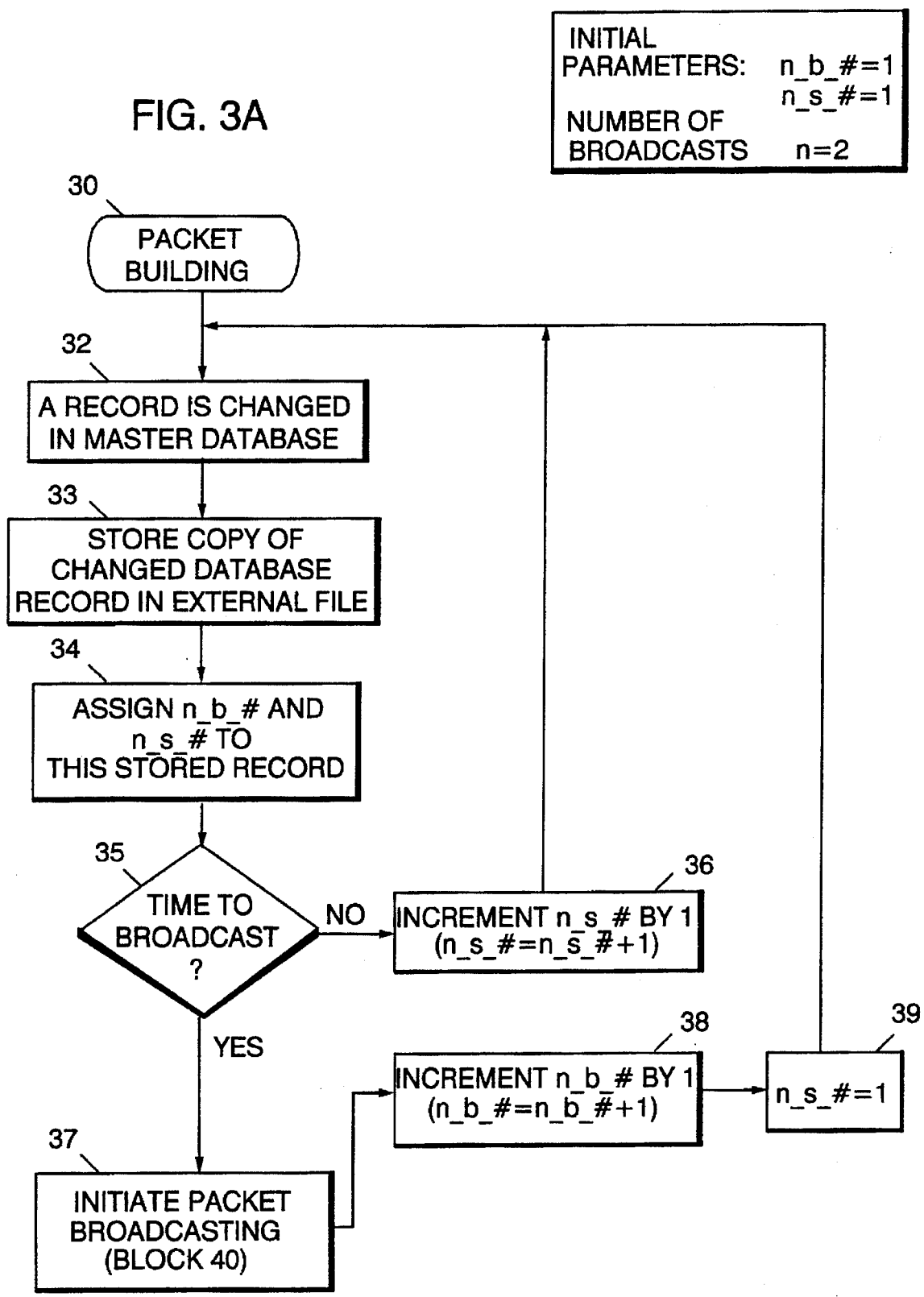

FIG. 5A

| CHANGES | NEXT BROADCAST NUMBER | NEXT SEQUENCE NUMBER |
|---|---|---|
| CHANGE 1 | 1 | 1 |
| CHANGE 2 | 1 | 2 |
| CHANGE 3 | 1 | 3 |
| CHANGE 4 | 1 | 4 |

CURRENT VALUE OF n_b_# = 1
i=1
n=2

FIG. 5B

| CHANGES | NEXT BROADCAST NUMBER | NEXT SEQUENCE NUMBER |
|---|---|---|
| CHANGE 1 | 1 | 1 |
| CHANGE 2 | 1 | 2 |
| CHANGE 3 | 1 | 3 |
| CHANGE 4 | 1 | 4 |

| CHANGES | NEXT BROADCAST NUMBER | NEXT SEQUENCE NUMBER |
|---|---|---|
| CHANGE 5 | 2 | 1 |
| CHANGE 6 | 2 | 2 |
| CHANGE 7 | 2 | 3 |

CURRENT VALUE OF n_b_# = 2
i=1, then 2
n=2

FIG. 5C

| CHANGES | NEXT BROADCAST NUMBER | NEXT SEQUENCE NUMBER |
|---|---|---|
| CHANGE 5 | 2 | 1 |
| CHANGE 6 | 2 | 2 |
| CHANGE 7 | 2 | 3 |

| CHANGES | NEXT BROADCAST NUMBER | NEXT SEQUENCE NUMBER |
|---|---|---|
| CHANGE 8 | 3 | 1 |
| CHANGE 9 | 3 | 2 |

CURRENT VALUE OF n_b_# = 3
i=2, then 3
n=2

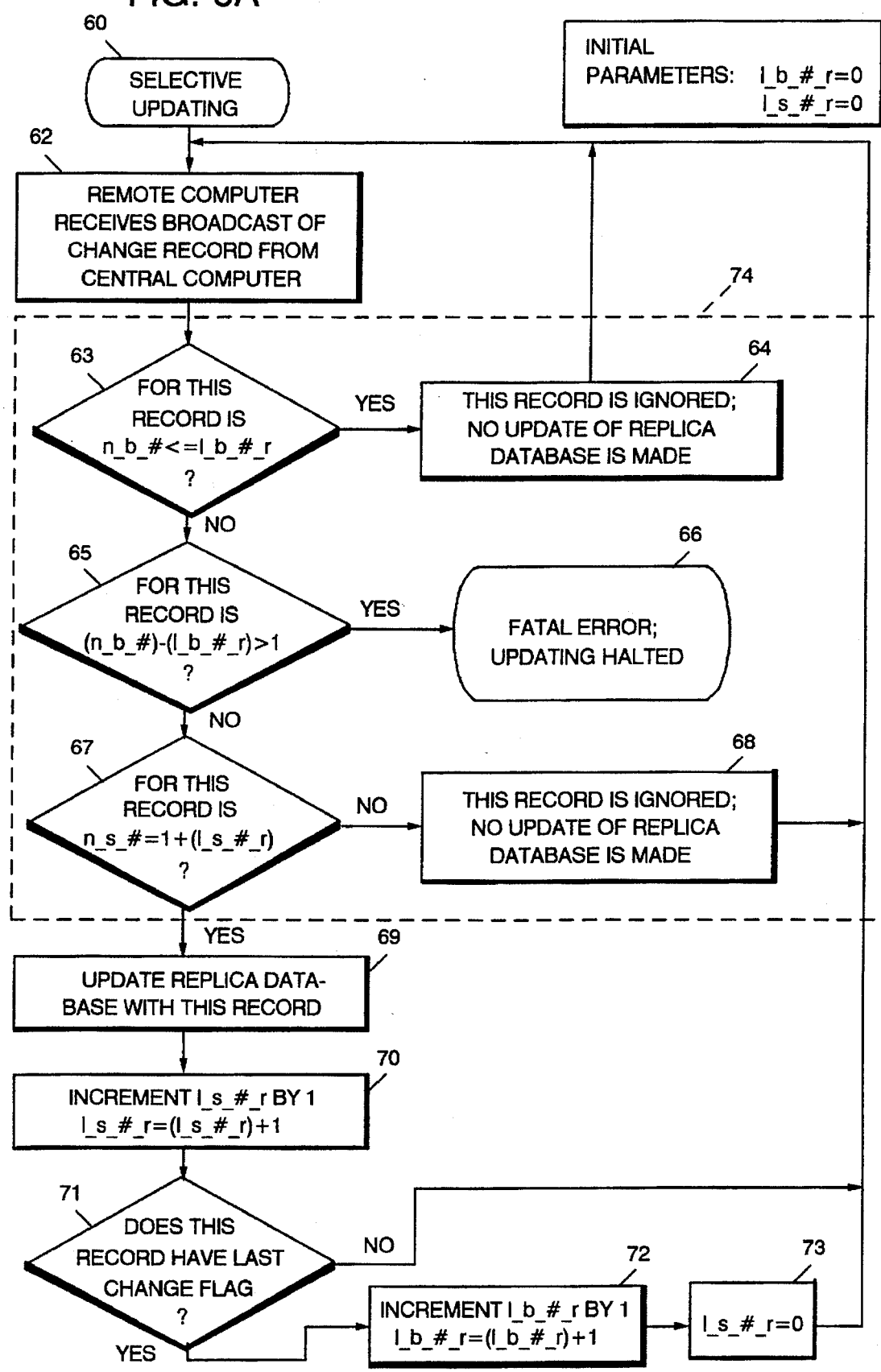

MASTER DATABASE CHANGE FILE

| CHANGES TO MASTER DATABASE | NEXT-BROADCAST-NUMBER | NEXT-SEQUENCE-NUMBER | |
|---|---|---|---|
| CHANGE 1 | 1 | 1 | ⎫ |
| CHANGE 2 | 1 | 2 | ⎬ TIME INTERVAL #1 |
| CHANGE 3 | 1 | 3 | ⎬ |
| CHANGE 4 | 1 | 4 | ⎭ |
| CHANGE 5 | 2 | 1 | ⎫ |
| CHANGE 6 | 2 | 2 | ⎬ TIME INTERVAL #2 |
| CHANGE 7 | 2 | 3 | ⎭ |
| CHANGE 8 | 3 | 1 | ⎫ TIME INTERVAL #3 |
| CHANGE 9 | 3 | 2 | ⎭ |

| CHANGE | NEXT-BROADCAST-NUMBER | NEXT-SEQUENCE-NUMBER | LAST-CHANGE |
|---|---|---|---|

SYSTEMS AND METHODS FOR SYNCHRONIZING DATABASES IN A RECEIVE-ONLY NETWORK

FIELD OF THE INVENTION

This invention relates to systems and methods for updating databases and more particularly to systems and methods for synchronizing a plurality of databases.

BACKGROUND OF THE INVENTION

In many computing environments, a database may be replicated in multiple, geographically-dispersed computers, not only to increase the availability and reliability of information, but also to increase the speed at which information is accessed. Typically, one database is a "master" database, wherein changes, updates, and record deletions are made. The remaining databases are referred to as "replica" databases. Of major concern in such an environment is insuring that any changes made to the master database are also incorporated within the replica databases. "Database synchronization" is the term for various techniques for insuring that a replica database is updated to reflect the current revision of its master database.

Many database synchronization techniques rely on two-way communication between a computer containing the master database and a computer containing a replica database. In one method, computers containing replica databases are programmed to initiate a conversation with the computer containing the master database and request that all updates and changes made since the last conversation be transmitted. Typically, each master database record changed is "time-stamped" with the date and time of the update. A comparison is made between the time-stamp for each updated or changed record in the master database and the time-stamp information of the requesting replica database. Those records having a time-stamp later than the time-stamp of the requesting database, or later than the last conversation, will be transmitted. See, for example, U.S. Pat. No. 5,261,094 to Everson et al. Unfortunately, the use of time-stamps can be unsatisfactory if the clocks of the computer containing the master database and the computer containing the replica database are not synchronized.

Another method for synchronizing a master database and a plurality of replica databases involves locking the master database and transmitting updates to each replica at the same time. This technique insures that all replicas are updated at the same time and that no changes can be made to the master database during this time period. Unfortunately, this procedure is disadvantageous for several reasons. First of all, it may not be desirable to lock the master database while changes are being identified and transmitted. No changes or updates can occur during the broadcast to the remote locations, consequently the master database is unavailable for use. Additionally, if a computer containing a replica database is not available for receiving the updates from the master database, then the master database has to be locked again and the changes transmitted when the computer is available.

Another synchronization method involves transmitting the entire master database at predetermined intervals to each replica site. This method is typically used in computer systems linked by receive-only communications, such as one-way satellite transmission systems. Unfortunately, the lack of two-way communication prohibits the remote location from acknowledging to the master database computer whether it received any particular transmission. As a result, database synchronization in a receive-only network is insured by transmitting the entire database many times. Unfortunately, multiple retransmissions of an entire database can be cumbersome, inefficient, and costly. This method may also require locking the master database during transmission.

Another drawback common to many of the existing database synchronization methods is that each remote site must be active in order to receive the transmitted database changes. If one site is inactive during transmission, the database contained therein will no longer be in synchronization with the master database or with other remote locations. Multiple transmissions have been utilized to overcome the possibility of any particular site being inactive. However, multiple transmissions alone do not provide a reliable indication of whether a replica database received an update or change to its master database.

SUMMARY OF THE INVENTION

It is therefore an object of the invention to provide improved systems and methods for synchronizing databases in a receive-only network.

It is another object of the invention to provide methods and systems for synchronizing databases in a receive-only network without requiring locking of a master database.

It is another object of the present invention to provide systems and methods for synchronizing databases in a receive-only network without requiring transmission or retransmission of an entire master database to each remote site.

These and other objects are provided, according to the present invention, by methods and systems for synchronizing databases among a central computer having a master database therein, and a plurality of remote computers in receive-only communication with the central computer, wherein each of the remote computers stores therein a replica of the master database. A plurality of changes to the master database which occur during a predetermined time period are stored in the file which is external to the master database. The same next-broadcast-number is assigned to each of the changes in the file and a sequential next-sequence-number is assigned to a respective one of the changes in the file. Each of the changes in the file, including the assigned same next-broadcast-number and the assigned sequential next-sequence-numbers is broadcast to the remote computers.

The remote computers receive the broadcast changes including the same next-broadcast-number and the sequential next-sequence-numbers, and the replica database at each remote computer is updated based upon the same next-broadcast-number and the sequential next-sequence-number assigned to each change in the received changes. By assigning the same next-broadcast-number and a sequential next-sequence-number, to each broadcast record during a predetermined time period, accurate and efficient determination can be made as to whether the record was already updated in the replica database. The databases can thereby be synchronized without requiring transmission or retransmission of the entire database and without requiring locking of the master database during transmission.

Preferably, repeated broadcasts are made of each of the changes in the file to the remote computers. Moreover, after expiration of the predetermined time period, a plurality of second changes to the master database which occur during a second predetermined time period are stored in the file. A second same next-broadcast-number is assigned to each of the second changes in the file and a second sequential next-sequence-number is assigned to the second changes in the file. Each of the second changes is then broadcast to the remote computers, and received at the remote computers. The replica database at each remote computer is then updated based upon the second same broadcast sequence number and the second sequential next-sequence-number which is assigned to each second change in the received changes.

The replica databases are preferably updated as follows: the replica database is updated with each record which is associated with a next-broadcast-number which is greater than a last received next-broadcast-number. Furthermore, the replica database is also updated with each record which is associated with a next-sequence-number which is greater than a last received next-sequence-number. Preferably, storing and assigning occurs independently of broadcasting so that the database need not be locked out. A last change in the plurality of changes having the same broadcast is also preferably identified. Storing and assigning at the central computer is preferably accomplished by packet building means which includes means for storing a plurality of changes to the master database which occurred during the predetermined time period in the file which is external to the master database and means, responsive to the storing means for assigning the same next-broadcast-number to each of the changes in the file and for assigning a sequential next-sequence-number to a respective one of the changes in the file. Selective updating means at each remote computer includes means for receiving the broadcast changes in the file and means which are responsive to the receiving means, for updating the replica database based upon the same next-broadcast-number and the sequential next-sequence-number assigned to each change in the received changes.

In a preferred embodiment for selectively updating the replica database, the remote computer receives a packet including a next-broadcast-number and a next-sequence-number. The received next-broadcast-number is compared with a last-broadcast-number-received which is maintained at the remote computer. If the received next-broadcast-number is less than or equal to a last-broadcast-number-received, the received packet is ignored. If the received next-broadcast-number is greater than the last-broadcast-number-received, the received next-sequence-number is compared with the last-sequence-number-received, for example, by one(1). The replica database is updated with the received packet if the received next-sequence-number is greater than the last-sequence-number-received. The received packet is ignored if the received next-sequence-number is not greater than the last-sequence-number-received, for example, by one (1). Upon detection of a last change flag, the last-broadcast-number-received is incremented and the last-sequence-number-received is reset.

If the next-sequence-number of the received record is greater than one(1) plus the last-sequence-number-received, this may be an indication that some change records were lost in the transmission. The remote computer ignores the records transmitted in this broadcast. If a next-broadcast-number is received but the remote computer has not received the last change flag for the previous next-broadcast-number, the remote computer ignores the records transmitted in this broadcast.

Changes to a database are preferably broadcast from a computer by storing a copy of the change to the database in a file which is external to the database and assigning a next-broadcast-number and a next-sequence-number to the copy. A determination is made if the broadcast time has arrived. If the broadcast time has not arrived, the next-sequence-number is incremented, and storing, assigning, determining and incrementing is performed on additional changes to the database until the broadcast time has arrived. When the broadcast time has arrived, each of the changes in the file including the assigned next-broadcast-number and next-sequence-numbers are broadcast. Following broadcast, the next-broadcast-number is incremented and the next-sequence-number is reset. Preferably, the changes in the file are repeatedly broadcast at predetermined time intervals.

Accordingly, databases are synchronized by broadcasting a collection of packets between a central computer and a plurality of remote computers. The packet collection includes a plurality of serially broadcast changes records, each of which includes update information for an associated database record. Each of the serially broadcast change records also includes a same next-broadcast-number associated therewith. A respective one of the serially broadcast change records also includes a sequential next-sequence-number associated therewith. The last serially broadcast change record also includes a last change flag. Efficient synchronization of databases in a receive-only network is thereby provided.

BRIEF DESCRIPTION OF THE DRAWINGS

FIG. 3A is a flow chart illustrating packet building in detail.

FIG. 3B sets forth the initial parameters for packet building.

FIGS. 5A–5C illustrate changed master database records each having a next-broadcast-number, and a next-sequence number.

FIG. 6A is a flow chart illustrating selective updating in detail.

FIG. 6B sets forth the initial parameters for selective updating.

DETAILED DESCRIPTION OF PREFERRED EMBODIMENTS

The present invention is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
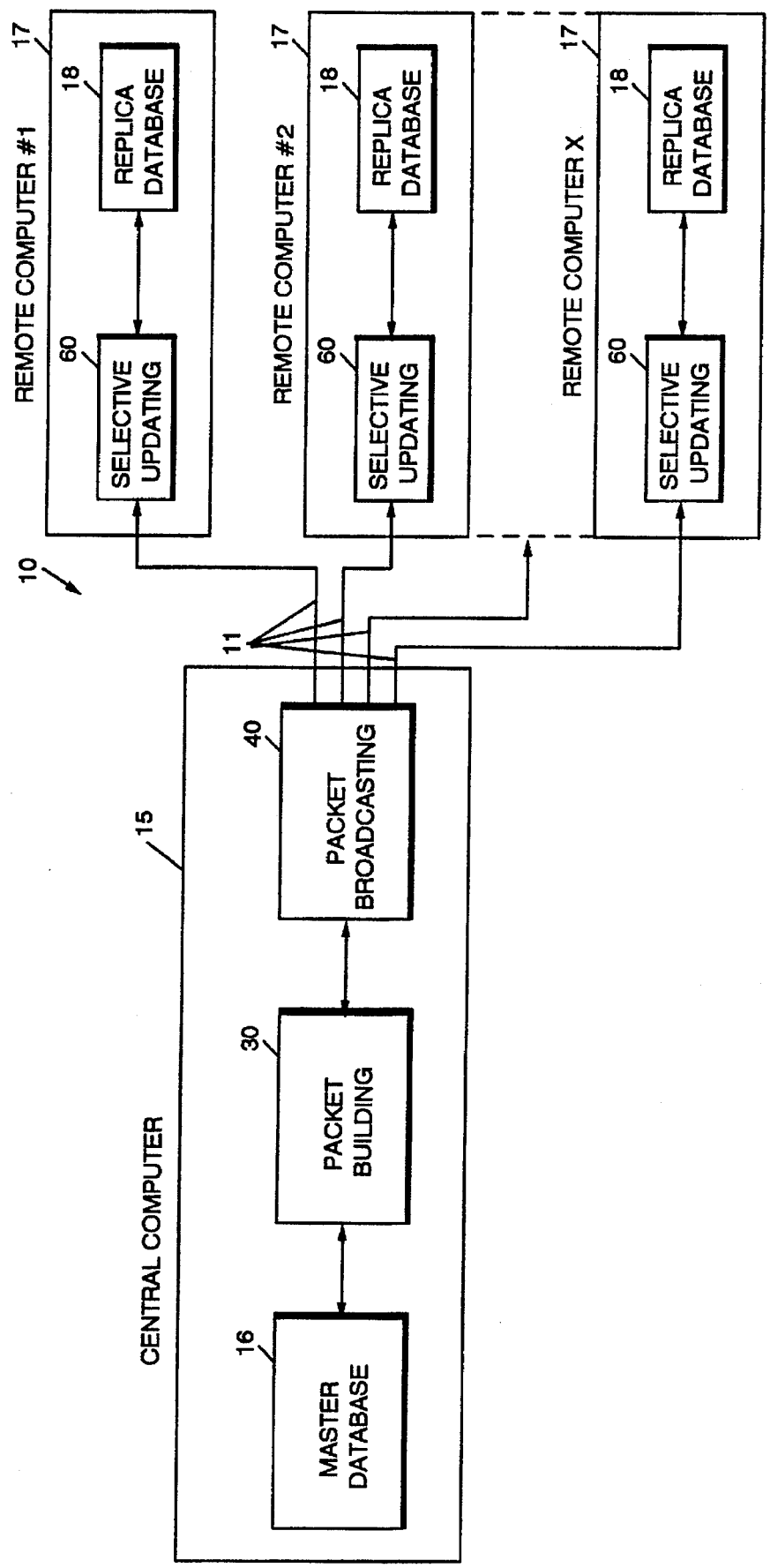
FIG. 1 schematically illustrates a central computer containing a master database in receive-only communication with a plurality of remote computers containing replicas of the master database.

Referring now to FIG. 1, a database synchronization system according to the present invention is schematically illustrated. The system 10 comprises a central computer 15 and a plurality of remote computers 17 in receive-only communication 11 with the central computer. The central computer 15 comprises a master database 16, a packet building operation (Block 30), and a packet broadcasting operation (Block 40) for broadcasting records changed in the master database to each remote computer 17. Each remote computer 17 comprises a replica 18 of the master database 16 and a selective updating operation (Block 60) for incorporating the broadcast records within the replica database. As would be understood by those having skill in the art, the central computer 15 may comprise a plurality of discrete master databases. Each remote computer 17 may contain a replica 18 of one or more of the master databases in the central computer 15. It will be understood that packet building, packet broadcasting, and selective updating means and steps may be implemented by a stored program which executes in the central computer 15 or remote computer 17 as appropriate, by special purpose hardware in these computers, or by combinations of hardware and software.

As is well known to those having skill in the art, a database is a collection of data organized for efficient retrieval. Analogous to a traditional card catalogue in a library, a database comprises a plurality of records (cards) each having a many discrete fields of information (author, title, Library of Congress number, etc.). The complete collection of cards (records) in the catalogue would be the database for the library's contents.

Changes made to the master database 16 are received by each remote computer 17; however, acknowledgment from the remote computer to the central computer is not provided. Receive-only communications systems are typically used in one-way satellite transmission systems. The design and integration of receive-only communication systems utilized by the present invention are well known and will not be described further.

Figure 2A:
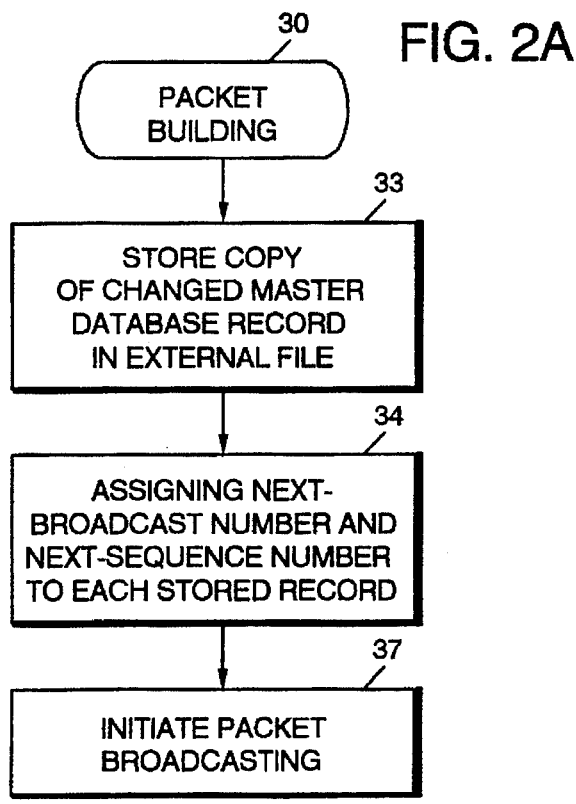
FIG. 2A is a flow chart illustrating packet building according to the present invention.

Referring to FIG. 2A, the packet building operation (Block 30) generally comprises storing a copy of each changed master database record in an external file (Block 33), assigning a next-broadcast-number and a next-sequence-number to each stored record (Block 34), and initiating (Block 37) the broadcasting operation (Block 40) for broadcasting the changed records to each remote computer 17.

Figure 2B:
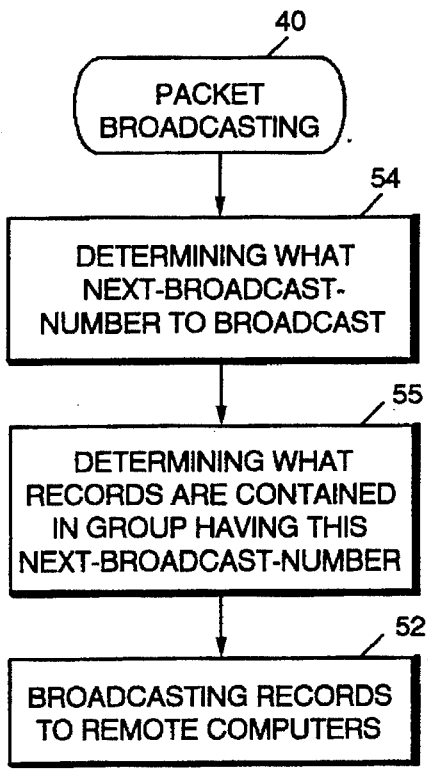
FIG. 2B is a flow chart illustrating packet broadcasting according to the present invention.
Figure 2C:
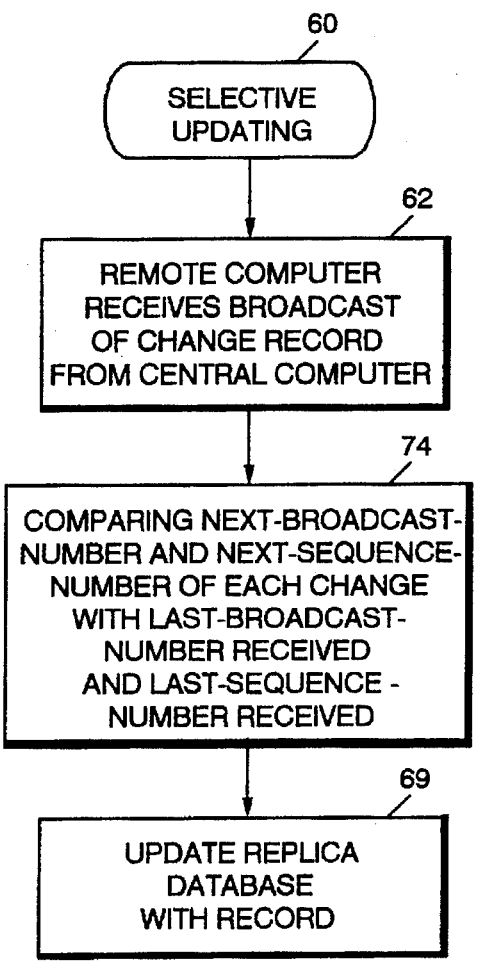
FIG. 2C is a flow chart illustrating selective updating according to the present invention.

Referring to FIG. 2B, the broadcasting operation (Block 40) generally comprises determining what next-broadcast-number is due for broadcasting (Block 54), determining what records have the next-broadcast-number due for broadcasting (Block 55), and broadcasting these records to each remote computer (Block 52). Referring to FIG. 2C, the selective updating operation (Block 60) within each remote computer 17 generally comprises receiving broadcasts (Block 62) from the central computer 15, comparing the received next-broadcast-number and next-sequence-number with the last-broadcast-number-received and the last-sequence-number-received (Block 74), and updating the replica with the record (Block 69) based on the results of the comparison.

Referring now to FIG. 3A, the packet building operation (Block 30) is described in detail. Beginning with a master database 16 that is synchronized with each of its replicas, for example, a master database to which no changes have been made, the initial parameters in FIG. 3B are utilized. The initial next-broadcast-number (n_b_#) and next-sequence-number (n_s_#) are assigned the value of 1. The number of broadcasts n, of any given group of records having the same next-broadcast-number, has been arbitrarily set to 2. However, as one skilled in the art would understand, the number of broadcasts n can be any number, depending on the circumstances. Preferably, the value of n is determined by a system administrator at the central computer.

Beginning with the first change made to a record within the master database 16 (Block 32), and with all subsequent record changes, including updates and deletions, a copy of each record changed is stored in a file external to the master database (Block 33). The advantage of this technique is that records in the master database can be changed during broadcasting and need not be locked. A next-broadcast-number and a next-sequence-number are assigned to each stored record (Block 34). After each changed record is stored in the external file, assigned both a next-broadcast-number and a next-sequence-number, a decision is made whether it is time to broadcast to each remote computer 17 the records stored thus far (Block 35). The time interval between broadcasts is user configurable and can be any interval including, but not limited to, minutes, hours, days, weeks, months, and years.

If it is not time to broadcast the accumulated records to the remote computers 17, the next-sequence-number is incremented by 1 (Block 36), and the next record stored in the external file is assigned the incremented next-sequence-number. For example, if 3 records have been accumulated thus far, each would have a next-sequence-number of 1, 2, and 3 respectively, and the next record stored in the file would receive a next-sequence-number of 4. The same next-broadcast-number is assigned to each record between broadcast intervals. If it is time to broadcast the accumulated records, the broadcasting procedure (Block 40) is initiated (Block 37), the next-broadcast-number is incremented by 1 (Block 38), and the next-sequence-number is reset to 1 (Block 39).

Figures 8, 9A, 9B:
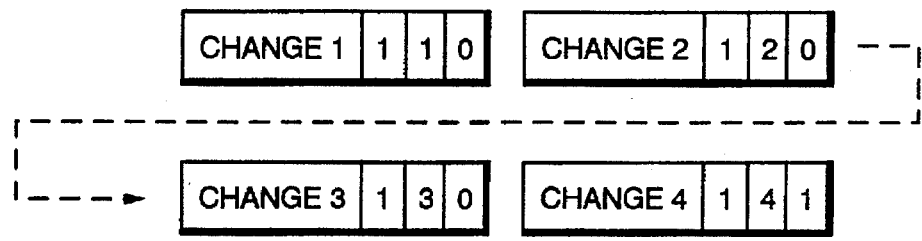
FIG. 8 illustrates a master database change file including changed records grouped according to broadcast interval.
FIG. 9A and 9B illustrate a packet containing a changed record, next-broadcast-number, next-sequence-number, and last-change flag, according to the present invention.

FIG. 8 illustrates an external file containing changed master database records stored over three time intervals. During time interval #1, four records in the master database 16 were changed and stored in the external file as Change 1, Change 2, Change 3, and Change 4. Each of these records were assigned a next-broadcast-number of 1 and were assigned a sequential next-sequence-number of 1, 2, 3, and 4, respectfully. During time interval #2, three records in the master database 16 were changed and stored in the external file as Change 5, Change 6, and Change 7. Each of these records were assigned a next-broadcast-number of 2 and were assigned a sequential next-sequence-number of 1, 2, and 3, respectfully. During time interval #3, two records in the master database 16 were changed and stored in the external file as Change 8 and Change 9. Each of these records were assigned a next-broadcast-number of 3 and were assigned a sequential next-sequence-number of 1 and 2, respectfully.

Returning to Block 35 in FIG. 3A, when it is determined that it is time to broadcast, the broadcasting operation is initiated (Block 37). immediately after initiating the broadcasting operation, the next-broadcast-number is incremented by 1 (Block 38) and the next-sequence-number is reset to 1 (Block 39). Each subsequent record stored in the external file will be assigned the incremented next-broadcast-number and will be assigned a sequential next-sequence-number until it is time to broadcast again.

Figure 4:
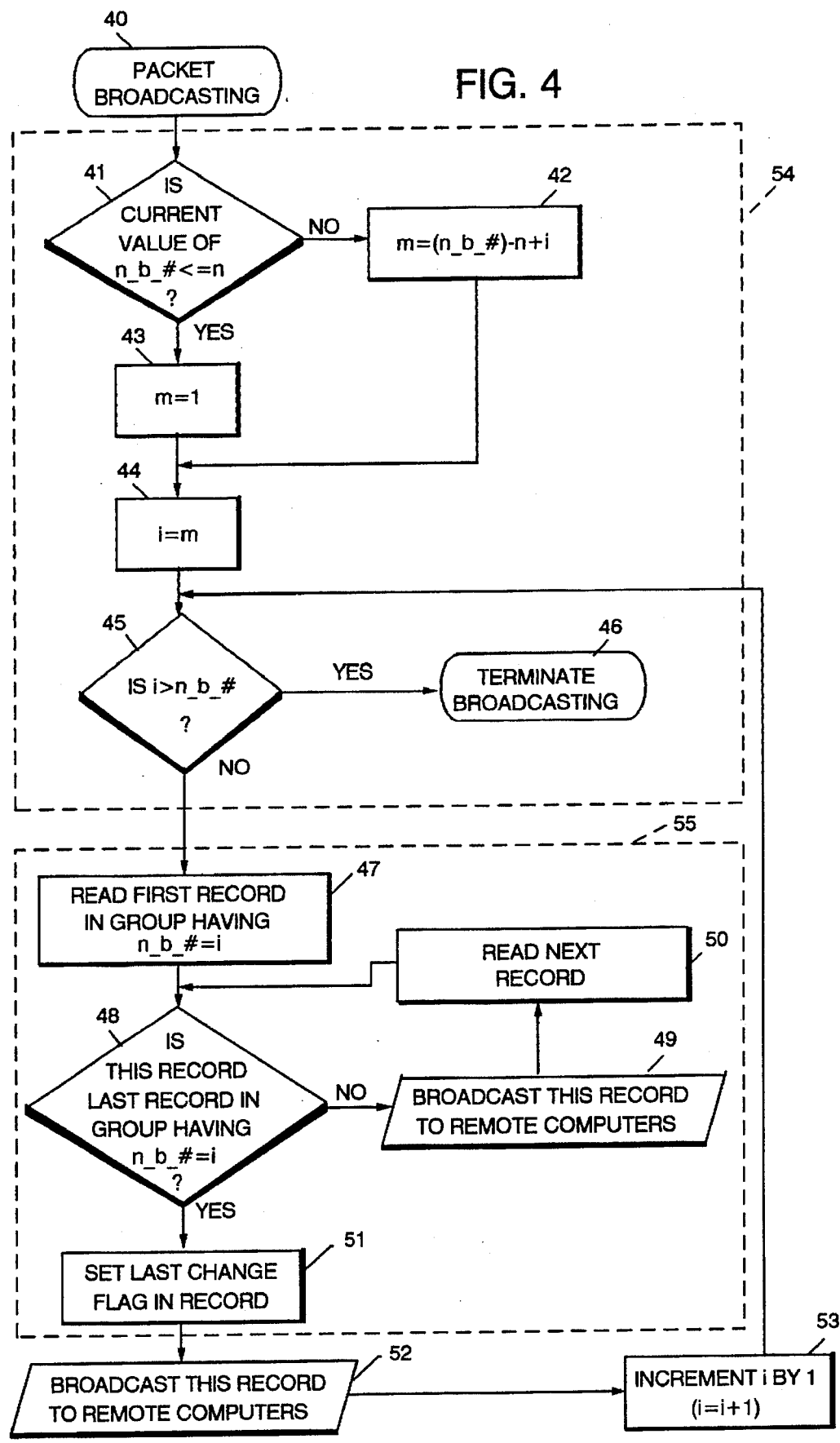
FIG. 4 is a flow chart illustrating packet broadcasting in detail.

Referring now to FIG. 4, the broadcasting operation (Block 40) is illustrated in detail. Initially, a determination of whether the current value of the next-broadcast-number, before being incremented in Block 38, is less than or equal to n (the number of transmissions of each group of records having the same next-broadcast-number) (Block 41). If the current value of the next-broadcast-number is less than or equal to n, m is set to 1 (Block 43). The variable m represents the next-broadcast-number shared by the group of records that will be broadcast first by the central computer 15. The variable i is a counter for incrementing the broadcast loop (Blocks 44-53), and initially is given the value of m (Block 44).

A determination is made whether i is greater than the current value of the next-broadcast-number (Block 45). If i is greater than the current value of the next-broadcast-number, the broadcast is ended. The reason that the broadcasting operation is terminated if i is greater than the current value of the next-broadcast-number is because all the change records stored so far have been broadcast.

If i is not greater than the current value of the next-broadcast-number, the first record is read (Block 47), and a determination is made as to whether this particular record is the last record in the group having a next-broadcast-number equal to i (Block 48). If it is not the last record in the group, the record is broadcast to each remote computer 17 (Block 49). The next record in the group having a next-broadcast-number equal to i is then read (Block 50) and a determination is made whether it is the last record in the group. (Block 48). If not, that record is broadcast to each remote computer 17 and the next record in the group is read (Block 50). The loop comprising Blocks 48, 49, and 50 continues until the last record in the group having a next-broadcast-number equal i is found. When the last record is found, a last change flag is set (Block 51) in that record packet prior to being broadcast to each remote computer 17 (Block 52). The counter i is incremented by 1 (Block 53), and a determination is made whether i is greater than the next-broadcast-number. If i is greater than the next-broadcast-number, the broadcast is ended; if i is less than or equal to the next-broadcast-number, the first record in the group wherein each record has a next-broadcast-number equal to the incremented i is read, and the above steps are repeated.

FIGS. 5A-5C in conjunction with FIG. 4 illustrate how the number of broadcasts of each group of records having the same next-broadcast-number is limited to the value of n. This example uses the changes already described in FIG. 8. Changes 1 through 4 are the only records in the first broadcast, designated by i=1. Referring back to Block 45 in FIG. 4, i has been incremented to the value of 2, which is greater than the value of the current next-broadcast-number. Consequently, the first broadcast is terminated.

When it is time to broadcast again, the next-broadcast-number for each of the records stored in the change file since the first broadcast is 2. Referring to Block 41 in FIG. 4, the value of the next-broadcast-number since the previous broadcast is less than or equal to n ($2 \leq 2$). Consequently, m=1 (Block 43), and i=1 (Block 44). The first record in the group having a next-broadcast-number equal to i (which is 1) is then read (Block 45), and the steps represented by Blocks 45 through 53 are performed. When the last record in the group having a next-broadcast-number of 1 is broadcast (Block 52), i is incremented by 1 (Block 53) and is now equal to 2. The first record in the group having a next-broadcast-number equal to 2 is then read (Block 45), and the broadcast steps represented by Blocks 45 through 53 are performed. When the last record in the group having a next-broadcast-number of 2 is broadcast (Block 52), i is incremented by 1 (Block 53) and is now equal to 3. In Block 45, the value of i is grater than the current next-broadcast-number (3>2) and the broadcasting operation is terminated (Block 46).

When it is time to broadcast again, the next-broadcast-number for each of the records stored in the change file since the second broadcast is 3. Referring to Block 41 in FIG. 4, the value of the next-broadcast-number since the previous broadcast is not less than or equal to n ($3 \not\leq 2$). Consequently, the value of m is equal to the next-broadcast-number minus n plus 1, which is 2 (2=3−2+1). The value of i is now 2 (Block 44). Thus, the first record in the group having a next-broadcast-number equal to 2 is read (Block 45), and the steps represented by Blocks 45 through 53 are performed. When the last record in the group having a next-broadcast-number is broadcast (Block 52), i is incremented by 1 (Block 53) and is now equal to 3. The first record in the group having a next-broadcast-number equal to 3 is then read (Block 45), and the broadcast steps represented by Blocks 45 through 53 are performed. When the last record in the group is broadcast (Block 52), i is incremented by 1 (Block 53) and is now equal to 4. In Block 45, the value of i is greater than the current next-broadcast-number (4>3) and the broadcasting operation is terminated (Block 46).

The broadcasting operation (Block 40) permits each group of records to be transmitted to each remote computer 17 n times. Each broadcast, except for the first, includes two groups of records: the group having the highest next-broadcast-number, and the group having the preceding next-broadcast-number. This is in FIGS. 5A-5C. In the first broadcast, four records (represented as change 1, change 2, change 3 and change 4) were broadcast. In the second broadcast, seven records (represented as change 1−change 7) were broadcast. In the third broadcast, five records (represented by change 5−change 9) were broadcast. As illustrated each group of records having the same next-broadcast-number was only broadcast twice. Although, as would be understood by those having skill in the art, the number of broadcasts n can be any number.

Referring now to FIG. 6A, the selective updating operation (Block 60) is described in detail. It is understood that throughout the drawings, l_b_#_r is the same as last-broadcast-number-received, and l_s_#_r is the same as last-sequence-number-received. Prior to receiving any records broadcast from the central computer 15, each remote computer 17 has the value of the last-broadcast-number-received and the last-sequence-number received set to zero (FIG. 6B). When a record is received by a remote computer 17 (Block 62), a determination is initially made whether the next-broadcast-number of the received record is less than or equal to the last-broadcast-number-received by the remote computer. If the next-broadcast-number of the received record is less than or equal to the last-broadcast-number-received by the remote computer, the record is ignored and the replica database 18 in the remote computer 17 is not updated (Block 64), because it has already been updated. The remote computer 17 awaits the next record in the broadcast.

If the next-broadcast-number of the received record is not less than or equal to the last-broadcast-number-received by the remote computer (Block 63), a determination is made whether the next-broadcast-number minus the lastbroadcast-number-received by the remote computer 17 is greater than t (Block 65). If the value of the next-broadcast-number minus the last-broadcast-number-received is greater than 1, records which were previously broadcast by the central computer either have not been received by this remote computer 17 or have been lost and the selective updating operation is ended. Operator intervention may be required at this point to synchronize the replica database with the master database.

If the value of the next-broadcast-number minus the last-broadcast-number-received is not greater than 1 (Block 65), a determination is made whether the next-sequence-number for the received record equals the sum of 1 plus the last-sequence-number-received by the remote computer 17 (Block 67). If the value of the sum of 1 plus the last-sequence-number-received does not equal the next-sequence-number of the received record, the record is ignored (Block 68) and the replica database 18 in this remote computer 17 is not updated. When the value of the sum of one (1) plus the last-sequence-number-received does not equal the next-sequence-number of the received record, this may be an indication that some change records were lost during the transmission. The remote computer 17 ignores the rest of the broadcast and waits for the next broadcast.

If the value of the sum of one (1) plus the last-sequence-number-received does equal the next-sequence-number of the received record, the replica database 18 is updated with this record (Block 69). The last-sequence-number-received by the remote computer 17 is incremented by 1 (Block 70), and then a determination is made whether this record contains a last change flag (Block 71), indicating that this is the last record in the group having this next-broadcast-number. If this record does not contain a last change flag, the remote computer 17 awaits the next record in the broadcast. If this record does contain a last change flag, the value of the last-broadcast-number-received is incremented by 1 (Block 72) and the last-sequence-number-received is reset to zero (Block 73), and then the remote computer 17 awaits the next record in the broadcast.

Figure 7:
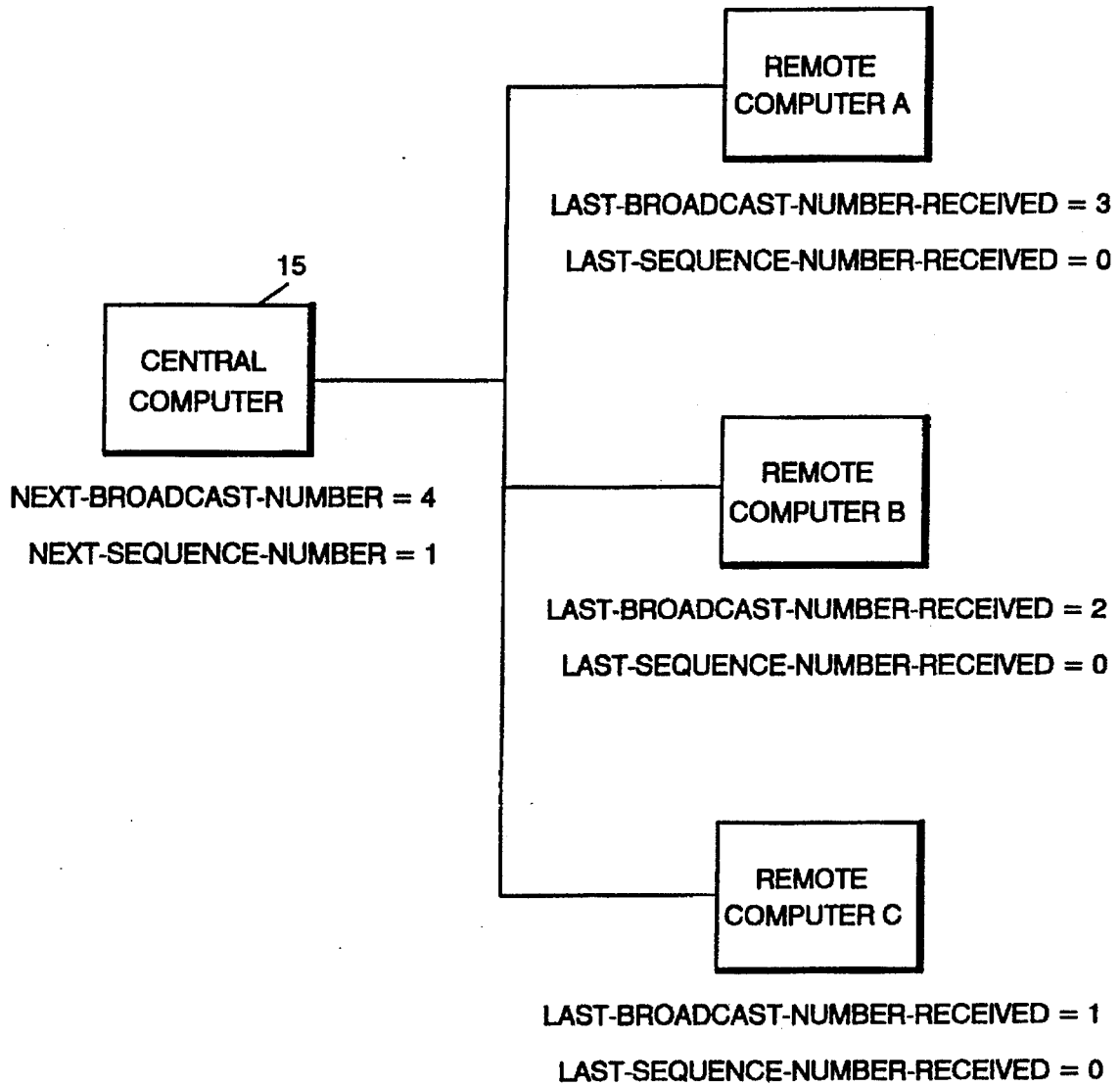
FIG. 7 illustrates a database synchronization technique, according to the present invention, as applied to three remote computers having replicas in receive-only communication with a central computer.

FIG. 7 illustrates the selective updating operation via a central computer 15 broadcasting records to three remote computers A, B, and C. Three broadcasts have been made from the central computer 15. This is indicated by the value of the next-broadcast-number, which is 4. At remote computer A, the value of the last-broadcast-number-received is 3, and the value of the last-sequence-number-received is zero. Thus, remote computer A has successfully received all records up to and including those having a next-broadcast-number of 3, which includes changes 1 through 9 (FIGS. 5A–5C).

At remote computer B, the value of the last-broadcast-number-received is 2, and the value of the last-sequence-number-received is zero. Thus, remote computer B has successfully received all records up to and including those having a next-broadcast-number of 2, which includes changes 1 through 7 (FIG. 5B). If the fourth broadcast is issued before any more changes have been stored in the change file. Remote computer A will ignore all records in this broadcast, and remote computer B will ignore changes 5 through 7 and will process changes 8 and 9.

At remote computer C, the value of the last-broadcast-number-received is 1, and the value of the last-sequence-number-received is zero. Thus, remote computer C has received all records up to and including those having a next-broadcast-number of 1, which includes changes 1 through 4 (FIG. 5A). However, the replica database in remote computer C is not synchronized with the master database because it has failed to receive changes 5 through 9, of which changes 5 through 7 are no longer being broadcast from the central computer. This may be seen by referring to Block 65 in FIG. 6A. Because the value of the next-broadcast-number for the next record to be broadcast to remote computer C is 4, the value of the next-broadcast-number minus the last-broadcast-number-received is greater than 1 (4−1>1). Consequently, intervention will be required to recover changes 5 through 7 and synchronize the replica database in computer C with the master database.

As would be understood by those having skill in the art, any value in addition to 1 could be used to increment the various variables as long as the incremental value is consistent throughout the packet building, broadcasting, and selective updating operations. For example, the next-sequence-number in Block 36 could be incremented by 5, as long as the steps in Blocks 67 and 70 use the same incremental value.

FIGS. 9A and 9B illustrate a format of a packet used to broadcast each record to each remote computer 17. Each packet comprises four fields: change, next-broadcast-number, next-sequence-number, and last-change. Within the "change" field is the master database record that was changed or deleted. The "next-broadcast-number" and the "next-sequence-number" fields contain the next-broadcast-number and the next-sequence-number for each record, respectively. The last-change field contains an indication of whether this particular record is the last record within a group of records having the same next-broadcast-number. Referring to FIG. 9B, four record packets are shown for the group having a next-broadcast-number of 1. The last-change field of the first three packets is set to zero to indicate that they are not the last record in the group. The last-change field of the fourth packet set to 1 to indicate that it is the last record in the group.

The values of the next-broadcast-number and the last-broadcast-number-received have maximum values and cannot be incremented indefinitely. Assuming that the next-broadcast-number field in a packet has 4-byte storage, the maximum value of a next-broadcast-number is $(2^{32}-1)$. Preferably, when a next-broadcast-number is $(2^{32}-1)$, its next value becomes 1 instead of $2^{32}$. The following operations may be used to determine whether a record should be discarded or received. These operations assume that the number of times a database change will be repeatedly broadcast is less than $(2^{32}-1)/2$.

```
diff = ABS (broadcast number of the change record −
  l_b_#_r);
If diff < ((2**32 −1)/2) then
    If broadcast number of the change record > l_b_#_r then
        apply the change;
    else
        ignore the change;
else:
    /* broadcast number has wrapped around */
    If broadcast number of the change record < l_b_#_r then
        apply the change;
    else
        ignore the change;
```

It is desirable for a remote computer to know when to stop waiting for records broadcast from a central computer. If (m−last-broadcast-number-received)>1, where the variable m represents the next-broadcast-number of a record, then one or more records with a next-broadcast-number of (1+last-broadcast-number received) have been sent n times, but have not been received and processed by the remote computer. Because m and the last-broadcast-number-received may have wrapped around as a result of reaching the maximum next-broadcast-number value of $2^{32}-1$, it is possible that m<last-broadcast-number-received. The following operations may be used to determine whether a remote computer should stop waiting for records from a central computer:

```
If m > l_b_#_r then
     if (m - l_b_#_r) > 1 then
          stop waiting for change records
     else
          keep on waiting for change records
else
     /* m and l_b_#_r have wrapped around */
     if (m + 2**32-1 - l_b_#_r) > 1 then
          stop waiting for change records
     else
          keep waiting for change records
```

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for synchronizing databases among a central computer having a master database therein, and a plurality of remote computers in receive-only communication with said central computer, each of said remote computers having therein a replica of said master database, said database synchronizing method comprising the steps of:

storing a plurality of changes to said master database, which occur during a predetermined time period, in a file which is external to said master database;

assigning a same next-broadcast-number to each of the changes in the file, and assigning a sequential next-sequence-number to a respective one of the changes in the file;

broadcasting each of the changes in the file to each of said plurality of remote computers which are in receive-only communication with said central computer, including the same next-broadcast-number and the sequential next-sequence-numbers;

receiving, at each of said plurality of remote computers which are in receive-only communication with said central computer, the broadcast changes in the file including the same next-broadcast-number and the sequential next-sequence-numbers; and updating the replica of said master database at each of said plurality of remote computers, which are in receive-only communication with said central computer, based upon the same next-broadcast-number and the sequential next-sequence-number assigned to each change in the received changes.

2. A database synchronizing method according to claim 1 wherein said broadcasting step comprises the step of repeatedly broadcasting each of the changes in the file to each of said plurality of remote computers, including the same next-broadcast-number and the sequential next-sequence-numbers, at predetermined time intervals.

3. A database synchronization method according to claim 2 further comprising the steps of:

storing a plurality of second changes to said master database, which occur during a second predetermined time period, in the file which is external to said master database;

assigning a second same next-broadcast-number to each of the second changes in the file, and assigning a second sequential next-sequence-number to a respective one of the second changes in the file;

broadcasting each of the second changes in the file to each of said plurality of remote computers, including the second same next-broadcast-number and the second sequential next-sequence-numbers;

receiving, at each of said plurality of remote computers, the broadcast second changes in the file including the second same next-broadcast-number and the second sequential next-sequence-numbers; and updating the replica database at each of said plurality of remote computers based upon the second same next-broadcast-number and the second sequential next-sequence-number assigned to each second change in the received changes.

4. A database synchronization method according to claim 2 wherein said updating step comprises the steps of:

updating the replica database with each record which is associated with a next-broadcast-number which is greater than a last received next-broadcast-broadcast-number; and updating the replica database with each record which is associated with a next-sequence-number which is greater than a last received next-sequence-number.

5. A database synchronizing method according to claim 1 wherein said broadcasting step operates independently of said storing and assigning steps.

6. A database synchronizing method according to claim 1 wherein said broadcasting step further comprises the step of identifying a last change in a plurality of changes having the same next-broadcast-number.

7. A system for synchronizing databases among a central computer and a plurality of remote computers in receive-only communication with said central computer, said database synchronizing system comprising:

a master database in said central computer;

a replica of said master database in each of said remote computers which are in receive-only communication with said central computer;

packet building means in said central computer, said packet building means comprising:

means for storing a plurality of changes to said master database, which occur during a predetermined time period, in a file which is external to said master database; and means, responsive to said storing means, for assigning a same next-broadcast-number to each of the changes in the file, and for assigning a sequential next-sequence-number to a respective one of the changes in the file;

broadcasting means in said central computer, and responsive to said packet building means, for broadcasting each of the changes in the file to each of said plurality of remote computers which are in receive-only communication with said central computer, including the same next-broadcast-number and the sequential next-sequence-numbers; and selective updating means in each of said plurality of remote computers which are in receive-only communication with said central computer, said selective updating means comprising:

means for receiving the broadcast changes in the file including the same next-broadcast-number and the sequential next-sequence-numbers; and means, responsive to said receiving means, for updating the replica database at each of said plurality of remote computers, which are in receive-only communication with said central computer, based upon the same next-broadcast-number and the sequential next-sequence-number assigned to each change in the received changes.

8. A database synchronizing system according to claim 7 wherein said broadcasting means comprises means for repeatedly broadcasting each of the changes in the file to each of said plurality of remote computers, including the same next-broadcast-number and the sequential next-sequence-numbers, at predetermined time intervals.

9. A database synchronization system according to claim 8:

wherein said storing means further comprises means for storing a plurality of second changes to said master database, which occur during a second predetermined time period, in the file which is external to said master database;

wherein said assigning means further comprises means for assigning a second same next-broadcast-number to each of the second changes in the file, and for assigning a second sequential next-sequence-number to a respective one of the second changes in the file;

wherein said broadcasting means further comprises means for broadcasting each of the second changes in the file to each of said plurality of remote computers, including the second same next-broadcast-number and the second sequential next-sequence-numbers;

wherein said receiving means further comprises means for receiving, at each of said plurality of remote computers, the broadcast second changes in the file including the second same next-broadcast-number and the second sequential next-sequence-numbers; and where in said updating means further comprises means for updating the replica database at each of said plurality of remote computers based upon the second same next-broadcast-number and the second sequential next-sequence-number assigned to each second change in the received changes.

10. A database synchronization system according to claim 8 wherein said updating means comprises:

means for updating the replica database with each record which is associated with a next-broadcast-number which is greater than a last received next-broadcast-number; and means for updating the replica database with each record which is associated with a next-sequence-number which is greater than a last received next-sequence-number.

11. A database synchronizing system according to claim 7 wherein said broadcasting means operates independently of said storing and assigning means.

12. A database synchronizing system according to claim 7 wherein said broadcasting means further comprises means for identifying a last change in a plurality of changes having the same next-broadcast-number.

13. A method for selectively updating a replica database in a remote computer, which is in receive-only communication with a central computer having a master database therein, said central computer broadcasting to said remote computer a series of changes to said master database as a series of packets, each of said packets including a next-broadcast-number and a next-sequence number, said remote computer including therein a last-broadcast-number-received and a last-sequence-number-received, said selective updating method comprising the steps of:

receiving, at said remote computer, which is in receive-only communication with said central computer, a packet including a next-broadcast-number and a next-sequence-number;

comparing the received next-broadcast-number with the last-broadcast-number-received;

ignoring the received packet if the received next-broadcast-number is less than or equal to the last-broadcast-number-received;

if the received next-broadcast-number is greater than the last-broadcast-number-received, comparing the received next-sequence-number with the last-sequence-number-received;

updating the replica database with the received packet if the received next-sequence-number is greater than the last-sequence-number-received; and ignoring the received packet if the received next-sequence-number is not greater than the last-sequence-number-received.

14. A selective updating method according to claim 13 wherein a last packet in said series of packets includes a last change flag, said selective updating method further comprising the steps of:

incrementing said last-broadcast-number-received in response to receipt of said last change flag; and resetting said last-sequence-number-received in response to receipt of said last change flag.

15. A method for broadcasting changes to a database from a computer comprising the steps of:

storing a copy of a change to said database in a file which is external to said database;

assigning a next-broadcast-number and a next-sequence-number to said copy;

determining if a broadcast time has arrived;

incrementing said next-sequence-number if a broadcast time has not arrived;

performing said storing step, said assigning step, said determining step and said incrementing step on additional changes to said database until the broadcast time has arrived; and broadcasting each of the changes in the file including the assigned next-broadcast-number and next-sequence-numbers, when the broadcast time has arrived.

16. A broadcasting method according to claim 15 wherein said broadcasting step is followed by the steps of:

incrementing the next-broadcast-number; and resetting the next-sequence-number.

17. A broadcasting method according to claim 15 wherein said broadcasting step comprises the step of repeatedly broadcasting each of the changes in the file including the assigned next-broadcast-number and next-sequence-numbers, at predetermined time intervals.

18. A broadcasting method according to claim 15 wherein said broadcasting step further comprises the step of identifying a last change in the changes in the file prior to arrival of the broadcast time.

19. A collection of packets for broadcasting a plurality of changes made to a master database to a plurality of replica databases, said packet collection comprising:

a plurality of serially broadcast change records, each of which includes update information for an associated database record;

each of said serially broadcast change records including a same next-broadcast-number associated therewith; and a respective one of said serially broadcast change records including a sequential next-sequence-number associated therewith.

20. A collection of packets according to claim 19 wherein said plurality of serially broadcast change records includes a last serially broadcast change record, said last serially broadcast change record further comprising a last change flag associated therewith.

* * * * *